Patented Aug. 27, 1935

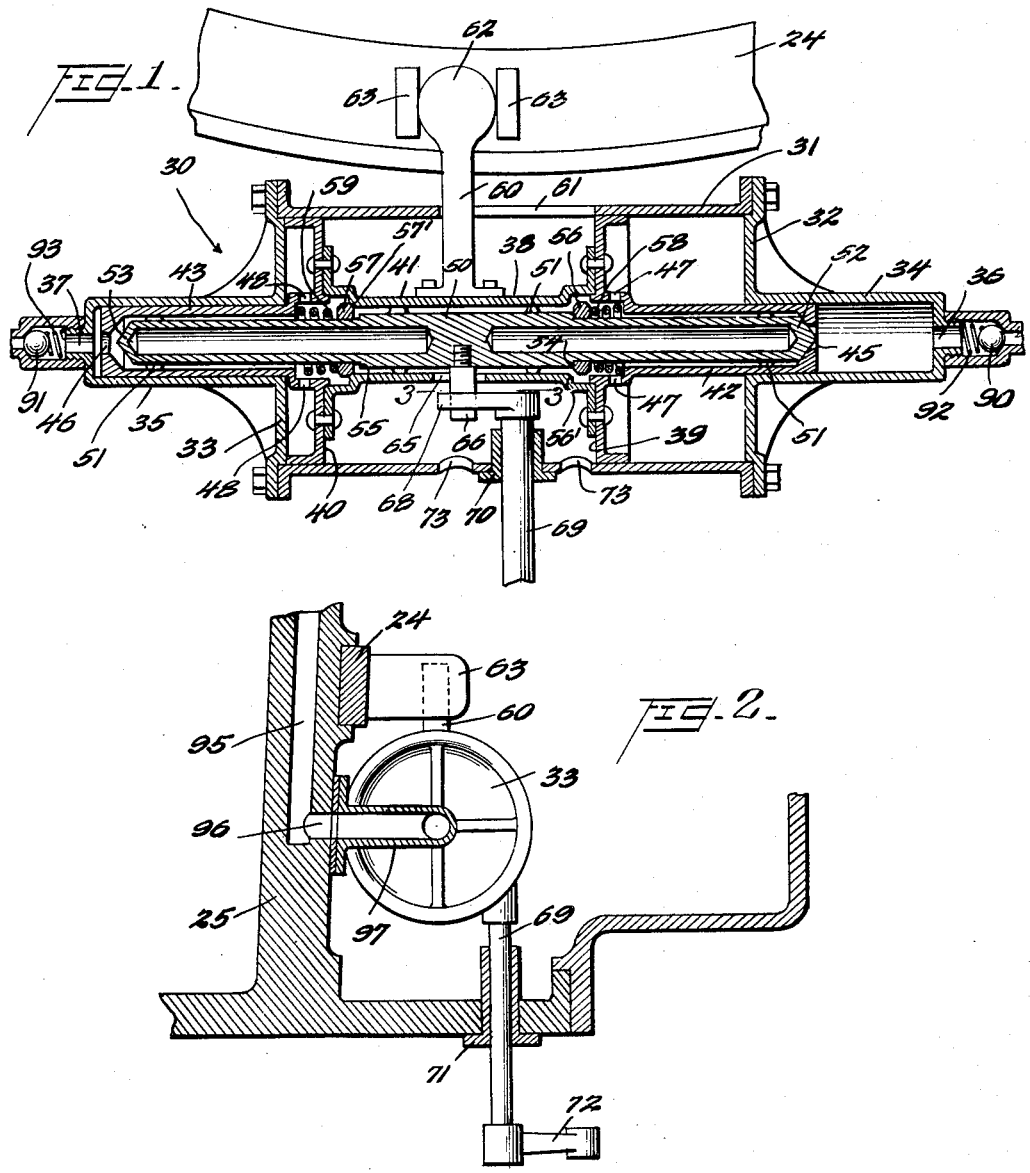

2,012,861

UNITED STATES PATENT OFFICE 2,012,861

SERVO-MECHANISM

Lionel M. Woolson, deceased, late of Detroit, Mich., by Emma F. Woolson, executrix, Bloomfield Village, Mich., assignor to Packard Motor Car Company, Detroit, Mich., a corporation of Michigan Application July 22, 1930, Serial No. 469,893

5 Claims. (Cl. 121—41)

The present invention relates to servomechanisms and particularly to servomechanisms of the fluid pressure type and adapted to operate a mechanical member by power but under the close control of an operator.

The use of servomechanisms for the manipulation of mechanical elements by power but under the close control of an operator is increasing, and many such mechanisms have heretofore been designed or suggested. The servomechanism which comprises the subject matter of the present invention is of general utility and may be widely employed throughout the mechanical arts. It is, however, particularly designed for use in connection with internal combustion engines, particularly multi-cylinder engines of the Diesel type, each of which engines includes an element for simultaneously manipulating the several mechanisms associated with the cylinders and provided for injecting fuel thereinto. A servomechanism designed to perform this function must be of light weight, small in size, and powerful in operation and must have the capacity to lock the operated element firmly in any position to which it may be adjusted. Conveniently a servomechanism used in conjunction with an internal combustion engine may utilize for its energizing fluid a portion of the lubricating oil which is placed under pressure by a pump and forced to the bearings of the engine.

The present servomechanism is well adapted for using engine lubricating oil under pressure although it is by no means limited in this respect, being capable of utilizing any suitable fluid under pressure as an actuating medium. It possesses many novel features which, taken together, render it eminently suitable for use not only in connection with internal combustion engines but for other purposes throughout the mechanical arts.

The invention may be very considerably modified, in adapting the same to various uses, by the redesign and rearrangement of its component elements, and one embodiment thereof is illustrated in the accompanying drawing and will be hereinafter described in detail by way of example.

In the drawing:

Figure 1 is a longitudinal axial section through the servomechanism;

Figure 2 is a transverse section through a portion of an internal combustion engine casing showing in end elevation the servomechanism and its operating element; and Figure 3 is a section on line 3—3 of Fig. 1.

As will be apparent to one skilled in the art, the present servomechanism is of general utility and is capable of many different uses. It may be employed, for instance, in connection with an internal combustion engine of the Diesel type having radially disposed cylinders such as disclosed in Patent No. 1,896,387, issued to Lionel M. Woolson, for manipulating the control ring which in turn controls the flow of the fuel injection plungers of the engine. This ring must be shifted or circumferentially moved through small angles about a center from time to time and must be firmly locked in position between adjustments.

A portion of such a ring is indicated at 24 in the drawing, and a portion of the engine casing upon which it is slidably mounted is indicated at 25.

The servomechanism by means of which the ring may be adjusted from time to time and locked in position comprises a cylindrical casing 31 which is secured by any suitable means to the casing of the internal combustion engine, a portion of which is indicated at 25. The ends 32 and 33 of the casing are provided with axial cylindrical extensions 34 and 35, the outer ends of these extensions being apertured at 36 and 37, respectively, to provide passages for the introduction of fluid, as, for instance, lubricating oil under pressure, into the hollow interiors of the extensions 34 and 35.

Slidably mounted within the main cylinder 31 is a piston, generally indicated at 38, this piston having two oppositely facing pressure portions 39 and 40 facing the end walls 32 and 33, portions 39 and 40 being connected by tubular member 41 so that both move together in the operation of the piston. Both portions 39 and 40 of the piston are provided with outwardly extending hollow cylindrical members, indicated respectively at 42 and 43, the cylindrical outer surfaces of these piston extensions being closely received within the coaxial cylindrical inner recesses of the cylinder projections 34 and 35. The extension 42 is provided with an axial aperture 45 in its end, and extension 43 has a similar aperture 46 formed in the end wall thereof. Extension 42 is enlarged in diameter somewhat adjacent its line of junction with pressure portion 39 of the piston, and this enlarged portion is perforated at a plurality of points, as indicated at 47, 47. Projection 43 is likewise provided with an enlarged portion having a plurality of apertures 48; in fact, the piston is formed symmetrically throughout, as indicated in the drawing.

Within the piston is an elongated, generally cylindrical member, indicated at 50, which may be designated a valve. Member 50 is slightly shorter than the central cylindrical chamber of the piston in which it is slidably held and is also of smaller diameter. It is supported centrally of the chamber in piston 38 by means of lugs or spacers 51 spaced at intervals along its length. Its end surfaces 52 and 53 are conical and constitute in reality valve surfaces adapted to seat against correspondingly formed conical surfaces on the inner faces of the ends of members 42 and 43. When member 50 is moved to the right, that is, to the position in which it is illustrated in Figure 1, port 45 is closed and port 46 fully opened; when moved to the left, port 45 is opened and port 46 closed; and, when moved to a central position, both ports are opened.

The central portion of the valve-like member 50 is slightly enlarged to provide oppositely facing shoulders 54 and 55. These shoulders serve as limiting stops for rings 56 and 57 slidably mounted upon valve 50 on opposite sides of the central enlarged portion thereof, rings 56 and 57 being normally urged to bear against these shoulders by coiled compression springs 58 and 59, the inner ends of these springs having contact with the respective rings and the outer ends being seated against inwardly facing shoulders, respectively, formed interiorly of piston 38.

When member 50 is moved to the right, as shown in Figure 1, to close the port 45 the right-hand spring 58 is compressed, but the left-hand spring expands, moving the ring 57 into contact with an annular seating surface 57' of the piston. Ring 57 in reality constitutes a valve which may, when the valve member 50 is moved to the right, as shown, close the annular passage between the valve member 50 and tubular member 41. Similarly ring 56 seats on an annular surface 56' when member 50 is moved to the left (Figure 1) and may also be said to function as a valve. When the member 50 is in a central position, rings 56 and 57 are seated, respectively, upon surfaces 56' and 57'.

Piston 38 has rigidly secured thereto a bracket-like member 60 which projects through a slot 61 in casing 31 and has a circular enlargement 62 on its free end, which enlargement lies between two spaced lugs 63 integral with, or secured to, the ring 24. The central tubular portion 38 of the piston is slotted at 65, and a pin 66 rigidly secured to the valve member 50 projects through this slot. This pin also lies within a slot 67 formed in an elongated member 68 rigidly secured upon the end of an operating shaft 69. Shaft 69, as is clearly illustrated in Figure 2, is supported in a bearing 70 in casing 31 and in a bearing 71 set into the casing of the engine. Upon its outer end it carries a crank arm 72 by means of which it may be connected to a suitable lever or handle which is accessible to the operator of the engine. Oil drainage holes 73 are formed in the cylindrical casing 31 on opposite sides of the bearing 70.

The outer end of a conduit 95 formed in casing 25 communicates, through port 96, with tube 97, which last mentioned tube extends from port 96 to the oil inlet port 37 of the cylinder 31. A similar means supplies the port 36 with oil from the same source and under the same pressure.

In the operation of the servomechanism the valve member 50 normally occupies a central position relatively to the piston, both ports 45 and 46 being open and both valves 56 and 57 being closed. With the parts so positioned, it will be obvious that the piston will remain in any position which it may then occupy, the fluid pressures acting upon its oppositely directed pressure faces being exactly balanced. If the valve body 50 is moved to the right (Figure 1), however, the flow of fluid through port 45 is blocked and the oil pressure in front of piston face 39 is reduced, this space being vented by the unseating of valve 56, the unseating of this valve permitting oil to flow through ports 47, 65, and 73 and into a suitable oil sump. As valve 57 is still seated and port 37 open, oil under full pressure flows rapidly into the space in front of piston face 40 and, this pressure being unbalanced, the piston as a whole is moved to the right, carrying member 60 with it and moving the fuel injection control ring 24.

This movement of the piston continues until valve 56 strikes its seating surface 56', thus preventing further discharge of oil from in front of the pressure face 39 of the piston. Movement of the piston also causes port 45 to be uncovered so that, even prior to final seating of valve 56, oil pressure is being built up in front of piston face 39.

The motion of the piston may be in small increments, such as just described, or it may be made continuous through longer distances by moving the valve body member 50 continuously, thus keeping valve 56 (or valve 57, as the case may be) off of its seat, movement of the piston continuing as long as either valve remains unseated. By means of this fluid pressure operated servomechanism, it is possible for the operator of the engine to quickly and easily adjust, from time to time, the angular position of the fuel injector control ring and thus modify the speed of the engine.

A servomechanism constructed in the manner set forth above has, in the usual case, the ability to hold the operated element against movement or "creeping" between periods of adjustment, that is, when the servomechanism is inactive, but, in the event that there is any considerable force, intermittent or constant, exerted by the operated element upon the servomechanism, for instance upon the part 60, it is desirable to provide means for positively locking the piston. Thus, in the case where the servomechanism is employed to actuate the fuel injection control ring of a Diesel engine of the type such as disclosed in the aforementioned patent, it is found that, because of the action of the fuel pump plunger springs and associated mechanism, there is developed a considerable force which tends to rotate the control ring in one direction so long as the engine is in operation.

To prevent this force from actually moving the piston of the servomechanism and thus permitting the fuel injection to be modified without the knowledge of the operator, means is provided to positively prevent egress of the fluid from the chambers outside of the piston faces 39 and 40 when the valve 50 is in neutral position. This means may conveniently comprise two non-return or check valves, such as rather diagrammatically indicated at 90 and 91, together with their associated springs 92 and 93 respectively. Once fluid under pressure has entered the servomechanism through either inlet port, it cannot escape until the exhaust valve is manipulated by the operator, even though there may be a considerable force exerted by the fuel control ring on the piston. The piston and ring are therefore positively locked in any position to which they may be moved in regulating the operation of the fuel injection plungers, and all possibility of "creeping" is avoided. Other means for positively locking the piston against accidental movement may be employed, if desired, this feature of the invention also being capable of considerable modification to suit the necessities of any particular installation. Should the oil pressure fail for any reason, the piston may be manually reciprocated by the valve body member, as will be apparent, so that the control of the operator over the movements of the ring 24 is never lost.

The invention may be considerably changed with regard to the design and arrangement of its component elements without departure from its spirit and scope in adapting the same to engines of various types and designs.

Having thus described the invention, what is claimed as new and desired to be secured by Letters Patent is:

1. A fluid motor comprising a cylinder having apertures in its ends for the introduction of fluid under pressure and an aperture at its mid-section for the escape of fluid, a piston in said cylinder and slidable axially thereof under the influence of unbalanced fluid pressure exerted against one end, said piston having passages therethrough to permit the escape of liquid from the cylinder ends, an elongated member carried by the piston and movable axially thereof, the opposed ends of said member comprising valves for controlling the inflow of fluid into the cylinder, and other valves carried by said member intermediate its ends for controlling the passage of liquid from the ends of the cylinder through the piston to the escape aperture in the cylinder wall.

2. A fluid motor comprising a cylinder having apertures in its ends for the introduction of fluid under pressure and an aperture at its mid-section for the escape of fluid, a piston in said cylinder and slidable axially thereof under the influence of unbalanced fluid pressure exerted against one end, and an elongated member movably carried by the piston and extending axially of the cylinder and piston, the opposed ends of said member comprising valves for controlling inflow of fluid into the cylinder, other valves carried by said member intermediate its ends for controlling the escape of liquid from the ends of the cylinder, and springs normally maintaining said valves in closed position and normally maintaining the valves at the ends of said member unseated.

3. A fluid motor comprising a cylinder having apertures in its ends for the introduction of fluid under pressure and an aperture at its mid-section for the escape of fluid, a piston in said cylinder and slidable axially thereof under the influence of unbalanced fluid pressure exerted against one end, a valve member carried by the piston, a fluid inlet and a fluid outlet valve for controlling the flow of fluid into and out of each end of the cylinder, the two outlet valves being movably mounted on said member and cooperating with seats formed on the piston, and a spring associated with each outlet valve and arranged to act upon the piston and upon the valve to normally maintain the valve seated, said springs being opposed and also acting through said valves upon said member to normally maintain the same in neutral position.

4. A fluid motor comprising a cylinder having apertures in its ends for the introduction of fluid under pressure and an aperture at its mid-section for the escape of fluid, a piston in said cylinder and slidable axially thereof under the influence of unbalanced fluid pressure exerted against one end, a valve member carried by the piston and having oppositely facing shoulders, a fluid inlet and a fluid outlet valve for controlling the flow of fluid into and out of each end of the cylinder, all four of said valves being carried by said member, the two outlet valves being slidably mounted on said member adjacent said shoulders and adapted to cooperate with seats formed on the piston and the two other valves being also adapted to cooperate with seats formed on the piston, and a spring associated with each outlet valve and arranged to act upon the piston and upon the valve to normally maintain the valve seated and in contact with the adjacent shoulder of said member, said springs being opposed and also acting through said valves upon said shoulders to normally maintain said member in neutral position.

5. The combination set forth in claim 4 in which said outlet valves are annular in form and the springs are helical and disposed to encircle the valve operating member.

EMMA F. WOOLSON,
*Executrix of the Estate of Lionel M. Woolson, Deceased.*